United States Patent
Chen et al.

[11] Patent Number: 6,141,450
[45] Date of Patent: Oct. 31, 2000

[54] IMAGE COMPRESSION SYSTEM USING HALFTONING AND INVERSE HALFTONING TO PRODUCE BASE AND DIFFERENCE LAYERS WHILE MINIMIZING MEAN SQUARE ERRORS

[75] Inventors: Li-Ming Chen, Chilung; Wei-Chih Chang, Hsinchu Hsien, both of Taiwan

[73] Assignee: Winbond Electronics Corporation, Taiwan

[21] Appl. No.: 09/023,663

[22] Filed: Feb. 10, 1998

[30] Foreign Application Priority Data

Jan. 9, 1998 [TW] Taiwan .................................. 87100242

[51] Int. Cl.[7] .............................. G06K 9/36; G06K 9/46
[52] U.S. Cl. ............................................. 382/237; 358/456
[58] Field of Search ..................................... 382/237, 275, 382/254, 205; 358/455, 429, 456, 463, 457, 447

[56] References Cited

U.S. PATENT DOCUMENTS

| | | | |
|---|---|---|---|
| 5,323,247 | 6/1994 | Parker et al. ............................ | 358/456 |
| 5,363,205 | 11/1994 | Shou et al. .............................. | 358/429 |
| 5,506,699 | 4/1996 | Wong ...................................... | 358/456 |
| 5,771,338 | 6/1998 | Nhu ......................................... | 395/109 |
| 5,790,692 | 8/1998 | Price et al. ............................. | 382/133 |

OTHER PUBLICATIONS

Wong, P. W. "Inverse halftoning and Kernal Estimation for Error Diffusion," IEEE Transactions on Image Processing, vol. 4, No. 4. pp. 486–498, Apr. 1995.

Ting et al, "Error Diffused Image Compression Using a Halftone-to-Gray Decoder and Predictive Pruned Tree-Structured Vector Quantization," IEEE Transactions on Image Processing, 1992.

*Primary Examiner*—Joseph Mancuso
*Assistant Examiner*—Joel Sebastian Shaughnessy
*Attorney, Agent, or Firm*—Fish & Richardson P.C.

[57] ABSTRACT

A two-layer image compression device is disclosed with a halftone circuit, an inverse halftone circuit and a quantization circuit. In this circuit, the halftone circuit converts the input gray-scale image into a binary image and rearranges the binary image output sequence to serve as a base layer of the input gray-scale image. The inverse halftone circuit recovers a predicted image from the binary image using the LMS algorithm and multi-table look-up methods. The quantization circuit then compares the input gray-scale image with the predicted image and encodes the difference between them to obtain an enhancement layer of the input gray-scale image.

14 Claims, 2 Drawing Sheets

IMAGE COMPRESSION SYSTEM USING HALFTONING AND INVERSE HALFTONING TO PRODUCE BASE AND DIFFERENCE LAYERS WHILE MINIMIZING MEAN SQUARE ERRORS

FIELD OF THE INVENTION

The present invention relates to an image compression device and the corresponding method, which halftone the input gray-scale image to obtain a binary image rearranged as a base layer and inverse halftone the binary image to obtain a predicted image so that an enhancement layer is derived by encoding the difference between the predicted image and the input gray-scale image.

BACKGROUND OF THE INVENTION

In order to decrease memory space and lower transmission speed, a gray-scale image is often compressed before being transmitted. In general, image compression is divided in three categories. The first method keeps data of the original gray-scale image and compresses it by elongated non-uniform coding, such as Huffmnan Coding. The second one, contrarily, abandons data of the original gray-scale image and compresses it by various transformations, such as Fourier Transform Coding and Walsh-Hadamard Transform Coding. The third method then utilizes vision persistence of human beings and compresses the gray-scale image by decreasing tone resolution while retaining brightness resolution.

SUMMARY OF THE INVENTION

However, it is difficult to have high compression ratios while maintaining quality images. Therefore, an object of the present invention is to provide an image compression device and the corresponding method, which halftone the input gray-scale image to obtain a binary image rearranged as a base layer (thus producing high compression ratios) and reconstructs a predicted image from the binary image so that the difference between the gray-scale image and the predicted image is encoded as an enhancement layer (thus producing quality images).

To achieve the above-indicated object and others, the present invention provides an image compression device and the corresponding method. The image compression device and corresponding method halftone the input gray-scale image into a binary image which is rearranged as a base layer. In addition, the image compression device and the corresponding method also reconstruct a predicted image from the binary image by minimizing reconstruction mean square errors, so that the difference between the input gray-scale image and the predicted image (the expected errors) is encoded as an enhancement layer.

In the compression method of the present invention, the input gray-scale image is generally stored in a halftone line buffer and an enhancement-layer line buffer for forward and inverse halftoning processes. In addition, the input gray-scale image and the predicted image is compared by a comparator, with the difference between them encoded by an A/D converter. Further, multi-table look-up can also be applied to the inverse halftoning process so that costs for large amounts of multiplication and corresponding time delays can be decreased.

Moreover, the image compression device of the present invention consists of a halftone circuit, an inverse halftone circuit and an quantization circuit. The halftone circuit converts the input gray-scale image into a binary image and rearranges the binary image output sequence to serve as a base layer of the input gray-scale image. The inverse halftone circuit selects some pixels from the binary image reconstructing a predicted image by minimizing reconstruction mean square errors. Further, the quantization circuit (including a comparator and an enhancement-layer encoder) compares the input gray-scale image and the predicted image and encodes the difference between them to obtain an enhancement layer of the input gray-scale image.

In addition, the image compression device of the present invention also includes a base-layer line buffer storing and rearranging the binary image, a base/enhancement layer output device outputting the base/enhancement layer in FIFO.

BRIEF DESCRIPTION OF THE DRAWINGS

The following detailed description, given by way of example and not intended to limit the invention solely to the embodiments described herein, will best be understood in conjunction with the accompanying drawings, in which.

DESCRIPTION OF THE PREFERRED EMBODIMENT

Digital halftoning is a method of rendering the illusion of n-bit gray-scale images (usually viewed as continuous-tone pictures) on binary displays. Conversely, digital inverse halftoning is used to reconstruct gray-scale images from binary halftone images. Halftoning is very popular for producing printed pictures. However, a number of image processing techniques such as filtering, enhancement and compression are more efficient when they are performed on the gray-scale images. In addition, inverse halftoning can be used to monitor the printer outputs and thus can provide information for the automatic calibration of the printing process. Hence, the inverse halftoning technique is becoming essential with respect to the growing applications of image processing, communications, storage and reproduction.

Halftoning is generally classified into two categories: ordered dither method and error diffusion method. With the ordered dither method, a gray-scale image is rendered by patching small areas with either clustered or dispersed dots. With the error diffusion method, errors are diffused between the original pixels and the corresponding halftone pixels to their neighbors.

Through much effort, several inverse halftoning methods have been advanced in the open literature, ranging from simple low-pass filtering to complicated three cascade algorithm. See C. M. Miceli and R. J. Parker, in "Inverse halftoning," J. Electronic Imaging, vol.1, pp.143–151, April 1992; P. W. Wong, in "Inverse halftoning and kernel estimation for error diffusion," IEEE Transactions on Image Processing, vol.4, no.4, pp.486–498, April 1995; and Y. T. Kim, R. Arce and N. Grabowski, in "Inverse halftoning using binary permutation filters," IEEE Transactions on Image Processing, vol.4, no.9, pp. 1296–1310, Sept. 1995.

The present invention combines forward/inverse halftoning, adaptive signal processing, differential pulse code modulation, image noise reduction and adaptive quantization to achieve high compression ratio and quality images.

Figure 1:
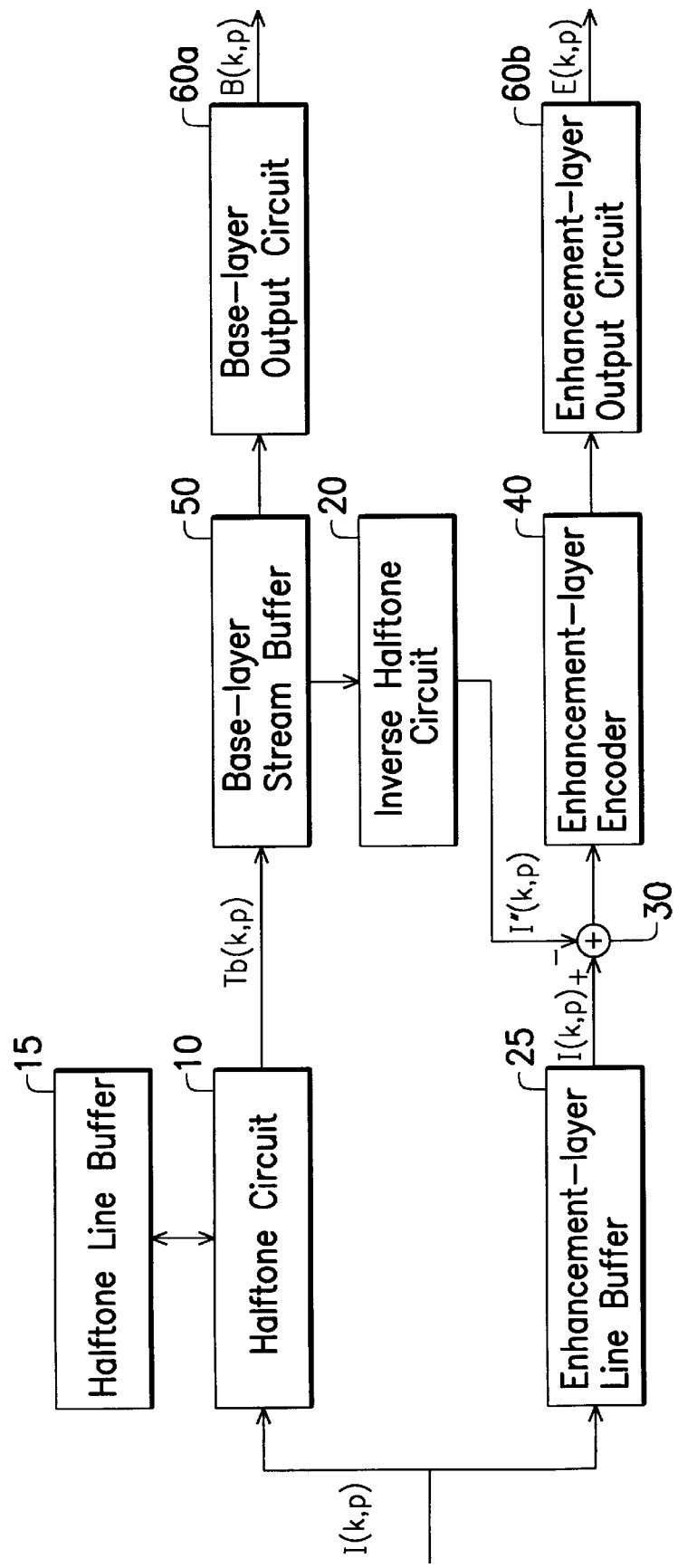
FIG. 1 is a block diagram of the image compression device of the present invention.

FIG. 1 is an image compression device of the present invention, in which the image compression device consists of a halftone circuit 10, a halftone line buffer 15, an inverse halftone circuit 20, an enhancement-layer line buffer 25, a comparator 30, an enhancement-layer encoder 40, a base-layer stream buffer 50, a base-layer output circuit 60a and an enhancement-layer output circuit 60b.

The halftone circuit 10 is provided to convert an input gray-scale image I(k,p) into a binary image Tb(k,p). In this embodiment, the halftone circuit 10 can be completed by ordered dither method or error diffusion method. And the gray-scale image I(k,p) is then stored in the halftone line buffer 15 for the halftoning process.

For simplicity, the operation of the halftone circuit 10 using the error diffusion method is described below.

Figure 2:
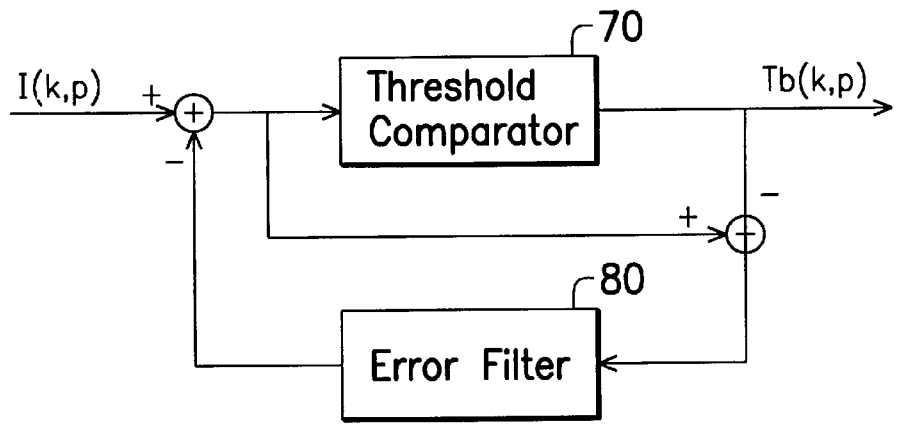
FIG. 2 is a block diagram of the halftone circuit in the image compression device of the present invention.

The error diffusion method was first proposed by Floyd and Steinberg in 1975 as shown in FIG. 2. FIG. 2 is a block diagram of the halftone circuit 10. In this method, since the original gray-scale image I(k,p) contains greater intensity levels than the halftone image Tb(k,p), there exists a difference (or so-called error) between the halftone intensity Tb(k,p) and the original gray-scale image I(k,p).

Let $$e_{xy} = I_{xy} - b_{xy}$$

where $e_{xy}$ is the intensity error at point (x,y), $b_{xy}$ is the halftone intensity, and $I_{xy}$ is the original gray-scale image intensity. The error diffusion approach then chooses successive $b_{xy}$'s in such a way as to minimize the accumulated error between the original gray-scale image I(k,p) and the halftone images Tb(k,p), which is implemented by the error filter 80 as shown in FIG. 2.

The algorithm is implemented as follows. A corrected intensity $I'_{xy}$ is computed from the previously computed errors and the current intensity, $I_{xy}$:

$$I'_{xy} = I_{xy} - \sum_{(k,l) \in S} h_{kl} e_{x-k, y-l}, (k, l) \in S$$

In this equation, the range of the indices (k,l) is defined by a preselected neighborhood S of the point $I_{xy}$. The coefficients of the error diffusion kernel $h_{kl}$ define the relative contributions of the previously computed errors to the corrected intensity and must satisfy $$h_{kl} \geq 0, \text{ and } \sum_{(k,l) \in S} h_{xy} = 1, (k, l) \in S$$

Then the corrected intensity is compared to a fixed threshold (R/2) using the threshold comparator 70 as shown in FIG. 2 to determine whether the corresponding halftone pixel should be turned on:

If $I_{xy} \geq R/2$, then $b_{xy} = R$ else $b_{xy} = 0$.

Finally, the error at point (x,y), $e_{xy} = I'_{xy} - b_{xy}$, is computed and saved for the generation of succeeding $I'_{xy}$ values.

Next, the inverse halftone circuit 20 selects some pixels from the binary image Tb(k,p) and reconstructs a predicted image I"(k,p) by minimizing reconstruction mean square errors.

In this embodiment, the forward halftoning process (implemented by the halftone circuit 10 as mentioned previously), a nonlinear quantization operation, is treated as an unknown noisy plant. The inverse halftoning process (implemented by the inverse halftone circuit 20) is thus viewed as an image restoration process that attempts to recover the original gray-scale images I(k,p) from the distorted (halftone) images Tb(k,p). Under this formulation, inverse halftoning becomes a typical system identification and the signal restoration problem in adaptive signal processing.

Figure 3A:
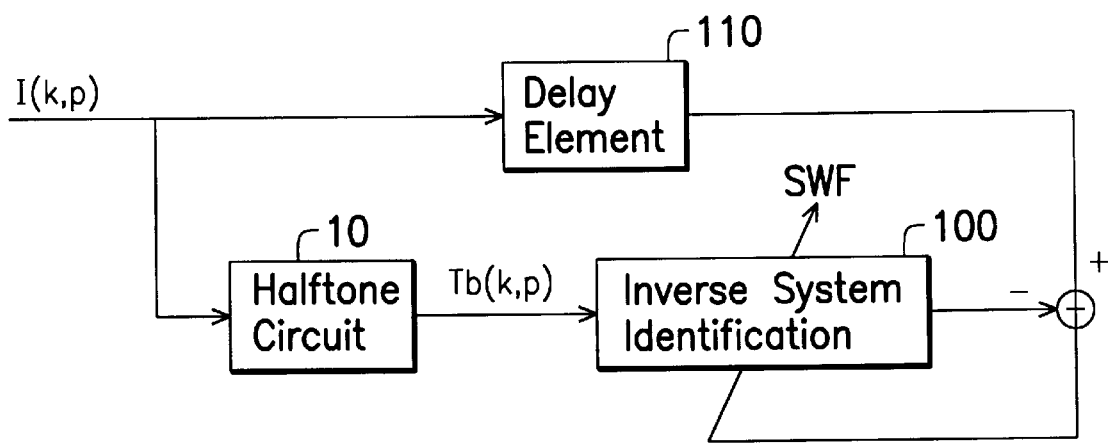
FIG. 3A and FIG. 3B are block diagrams of the inverse halftone circuit in the image compression device of the present invention.
Figure 3B:
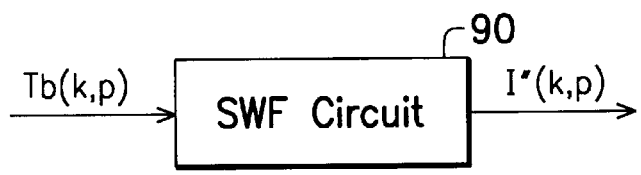

FIG. 3A and FIG. 3B are block diagrams of the inverse halftone circuit 20. In this embodiment, a linear sliding-window filter SWF (not shown) is provided with its optimal weights derived by minimizing reconstruction mean square errors. Then, for each to-be-processed pixel located at (k,p), a two-dimensional window S centered around (k,p) is chosen as the filter support. As in FIG. 3A, the adjusted weights SWF are derived recursively corresponding to the delayed input gray-scale image I(k,p) (as implemented by the delay element 110 in FIG. 2) and the halftone binary image Tb(k,p) (as implemented by the inverse system identification circuit 100 in FIG. 2). FIG. 3B shows that the reconstructed (predicted) image is computed by linearly combining the binary halftone image Tb(k,p) according to the adjusted weights SWF (as implemented by the SWF circuit 90 in FIG. 3B) derived from the inverse system identification circuit 100.

For simplicity, this window S can have a rectangular shape. If the window size is m×n, $S = \{(i,j); -m/2 \leq i \leq m/2$ and $-n/2 \leq j \leq n/2\}$. The filter weights associated with this window S form a vector which is denoted by $W = \{W(i,j); (i,j) \in S\}$. In reconstruction phase, the reconstructed pixel is computed by linearly combining the halftone pixels inside the window S, as:

$$I''(k,p) = \Sigma\Sigma[Tb(k-i, p-j) * W(i,j)], (i,j) \in S$$

where I"(k,p) represents the reconstructed gray-scale pixel, and Tb(i,j), the binary pixel (0 is the black and 255 is white). This process is repeated for every pixel in the halftone binary image Tb(k,p), i.e., this window S is slid across the image one pixel at a time.

Further, in the training phase, the filter weights are derived using the well-known least-mean-square (LMS) algorithm. The training data vector, $b(t) = \{b(k-i, p-j); (i,j) \in S\}$, is made of the halftone image pixels inside the filter support S at every legal pixel location (k,p), where t is a sequential index assigned to the pixel (k,p).

A complete block of training data consists of the original gray-scale image pixel, I(t)=I(k,p), and the corresponding halftone training vector b(t). Then, W is denoted by applying the following formula to the entire set of training data blocks iteratively, $$W(t+1) = W(t) + 2 * \beta * \epsilon(t) * b(t)$$

where $\epsilon(t)$ is the reconstruction error at (k,p), $k(t) = I(t) - [b(t)]^T * W(t)$ and $\beta$ is a small updating rate parameter (around 0.00000001). The above iterative process terminates when the mean-square-error (MSE) decrease is insignificant from the previous iteration.

A detailed description is given below.

1. In training phase
  (a) Set (x,y) to the upper-left-most point at which there are enough pixels to form a complete window $S''_{mn}$ and $B_{mn}$.
  (b) Perform the LMS updating algorithm to update the weights of the W(k,l) matrix:

for k=0 to m−1
for l=0 to m−1

$$W(k,l)_{J+1}=W(k,l)_J 2\mu \epsilon_J b_{kl}(J)$$

where J increases for every available data block, $\mu$ is the updating rate and $$\epsilon_J = I_{xy} - \Sigma\Sigma b_{kl} W(k,l), (k,l) \in B_{mn}$$

(c) If (x,y) reaches the lower-right-most point at which the remaining pixels cannot form a complete window $S_{mn}$ or $B_{mn}$, stop; otherwise, move (xy) to the next pixel location and proceed to step (b).

2. Reconstruction phase

All steps are the same as in the training phase except (b).

Every reconstructed pixel is thus replaced by computing the binary halftone pixel by the following equation:

$$I''_{xy} \Sigma\Sigma b_{kl} W_{kl}, (k,l) \in B$$

According to the reconstruction formula with the training optimal weights, $I''(k,p)=\Sigma\Sigma[b(k-I,p-j)*W(k,l)]$, $(i,j)\in S$; directly producing one predicted gray-scale pixel value requires a great amount of computation, including multiplication (m×n) times and addition (m×n−1) times. In order to reduce the computation amount, several useful small-size tables are made. In this embodiment, a multi-table look-up method is introduced in the following:

Suppose m=5, n=5, window size is m×n=5×5, $$I''(k,p)=\Sigma\Sigma[b(k-i,p-j)*W(k,l)], (i,j)\in S, S=\{(i,j); -2\leq i\leq 2 \text{ and } -2\leq j\leq 2\}$$

For simplicity, choose $W(i,j) \geq 0$ and suppose $Tb(k-i,p-j)=b(k-i,p-j)/255$ and $TW(i,j)=W(i,j)*255$, It means Tb is always 0 for black or 1 for white.

$$I'(k,p)=\Sigma\Sigma[Tb(k-I,p-j)*TW(k,l)].$$

Then, suppose $$I_2(k, p) =$$
$$T_1(Tb(k-1, p-2), Tb(k-1, p-1), Tb(k-2, p-2), Tb(k-2, p-1)) +$$
$$T_2(Tb(k+1, p-2), Tb(k+1, p-1), Tb(k, p-2), Tb(k, p-1)) +$$
$$T_3(Tb(k-1, p), Tb(k-1, p+1), Tb(k-2, p), Tb(k-2, p+1)) +$$
$$T_4(Tb(k+1, p), Tb(k+1, p+1), Tb(k, p), Tb(k, p+1)) +$$
$$T_5(Tb(k+2, p-2), Tb(k+2, p-1),$$
$$Tb(k+2, p), Tb(k+2, p+1), Tb(k+2, p+2)) +$$
$$T_6(Tb(k+1, p-2), Tb(k+1, p-1), Tb(k, p-2), Tb(k, p-1))$$

where $T_1, T_2, T_3, T_4, T_6$ are 4-index tables such that the numerical presentation of the content uses positive floating data-type, and $T_5$ is a 5-index table such that the numerical presentation of the content uses positive floating data-type.

$$T_1(Tb(k-1, p-2), Tb(k-1, p-1), Tb(k-2, p-2), Tb(k-2, p-1)) =$$
$$Tb(k-1, p-2)*TW(1, 2) + Tb(k-1, p-1)*TW(1, 1) +$$
$$Tb(k-2, p-2)*TW(2, 2) + Tb(k-2, p-1)*TW(2, 1)$$
$$T_2(Tb(k+1, p-2), Tb(k+1, p-1), Tb(k, p-2), Tb(k, p-1)) =$$
$$Tb(k+1, p-2)*TW(-1, 2) + Tb(k+1, p-1)*TW(-1, 1) +$$
$$Tb(k, p-2)*TW(0, 2) + Tb(k, p-1)*TW(0, 1)$$
$$T_3(Tb(k-1, p), Tb(k-1, p+1), Tb(k-2, p), Tb(k-2, p+1)) =$$
$$Tb(k-1, p)*TW(1, 0) + Tb(k-1, p+1)*TW(1, -1) +$$
$$Tb(k-2, p)*TW(2, 0) + Tb(k-2, p+1)*TW(2, -1)$$
$$T_4(Tb(k+1, p), Tb(k+1, p+1), Tb(k, p), Tb(k, p+1)) =$$
$$Tb(k+1, p)*TW(-1, 0) + Tb(k+1, p+1)*TW(-1, -1) +$$
$$Tb(k, p)*TW(0, 0) + Tb(k, p+1)*TW(0, -1)$$
$$T_5(Tb(k+2, p-2), Tb(k+2, p-1), Tb(k+2, p),$$
$$Tb(k+2, p+1), Tb(k+2, p+2)) =$$
$$Tb(k+2, p-2)*TW(-2, 2) + Tb(k+2, p-1)*TW(-2, 1) +$$
$$Tb(k+2, p)*TW(-2, 0) + Tb(k+2, p+1)*TW(-2, -1) +$$
$$Tb(k+2, p+2)*TW(-2, -2)$$
$$T_6(Tb(k+1, p-2), Tb(k+1, p-1), Tb(k, p-2), Tb(k, p-1)) =$$
$$Tb(k+1, p-2)*TW(-1, 2) + Tb(k+1, p-1)*TW(-1, 1) +$$
$$Tb(k, p-2)*TW(0, -2) + Tb(k, p-1)*TW(0, 1)$$

in the absence of numerical accuracy problems, $I''(k,p)=I_2(k,p)$ if with numerical omission, we choose T1,T2,T3,T4,T6 which are 4-index tables such that the numerical presentation of the content uses 8-bit positive integer data-type, and T5 is a 5-index table such that the numerical presentation of the content uses 8-bit positive integer data-type, the above equations will rewrite to $$T_1(Tb(k-1, p-2), Tb(k-1, p-1), Tb(k-2, p-2), Tb(k-2, p-1)) =$$
$$\text{int}[Tb(k-1, p-2)*TW(1, 2) + Tb(k-1, p-1)*TW(1, 1) +$$
$$Tb(k-2, p-2)*TW(2, 2) + Tb(k-2, p-1)*TW(2, 1)]$$
$$T_2(Tb(k+1, p-2), Tb(k+1, p-1), Tb(k, p-2), Tb(k, p-1)) =$$
$$\text{int}[Tb(k+1, p-2)*TW(-1, 2) + Tb(k+1, p-1)*TW(-1, 1) +$$
$$Tb(k, p-2)*TW(0, 2) + Tb(k, p-1)*TW(0, 1)]$$
$$T_3(Tb(k-1, p), Tb(k-1, p+1), Tb(k-2, p)Tb(k-2, p+1)) =$$
$$\text{int}[Tb(k-1, p)*TW(1, 0) + Tb(k-1, p+1)*TW(1, -1) +$$
$$Tb(k-2, p)*TW(2, 0) + Tb(k-2, p+1)*TW(2, -1)]$$
$$T_4(Tb(k+1, p), Tb(k+1, p+1), Tb(k, p), Tb(k, p+1)) =$$
$$\text{int}[Tb(k+1, p)*TW(-1, 0) + Tb(k+1, p+1)*TW(-1, -1) +$$
$$Tb(k, p)*TW(0, 0) + Tb(k, p+1)*TW(0, -1)]$$
$$T_5(Tb(k+2, p-2), Tb(k+2, p-1), Tb(k+2, p),$$
$$Tb(k+2, p+1), Tb(k+2, p+2)) =$$
$$\text{int}[Tb(k+2, p-2)*TW(-2, 2) + Tb(k+2, p-1)*TW(-2, 1) +$$
$$Tb(k+2, p)*TW(-2, 0) + Tb(k+2, p+1)*TW(-2, -1) +$$
$$Tb(k+2, p+2)*TW(-2, -2)]$$
$$T_6(Tb(k+1, p-2), Tb(k+1, p-1), Tb(k, p-2), Tb(k, p-1)) =$$
$$\text{int}[Tb(k+1, p-2)*TW(-1, 2) + Tb(k+1, p-1)*TW(-1, 1) +$$
$$Tb(k, p-2)*TW(0, -2) + Tb(k, p-1)*TW(0, 1)]$$

$$I'(k, p) \cong I_2(k, p)$$

Now in the previous case, where m=5, n=5, to produce one predicted gray-scale pixel value, it is necessary that table look-up is performed 6 times and integer addition 5 times. Compared to the original 24 floating addition, the computation amount for one pixel is obviously reduced.

In addition, the image compression device of the present invention also consists of the base-layer stream buffer 50 storing and rearranging the halftone binary image Tb(k,p) to serve as the base layer B(k,p) of the input gray-scale image I(k,p) before being inverse halftoned by the inverse halftone circuit 20. And the input gray-scale image I(k,p) is also stored in the enhancement-layer line buffer 25 so that the gray-scale image I(k,p) and the predicted (reconstructed) image I"(k,p) are compared by the comparator 30 with the difference between them encoded by the enhancement-layer encoder 40, wherein the encoded difference serves as the enhancement layer E(k,p) of the input gray-scale image I(k,p).

Further, the image compression device of the present invention also consists of a base-layer output circuit 60*a* and an enhancement-layer output circuit 60*b* outputting the base layer B(k,p) (the rearranged halftone binary image Tb(k,p) stored in the base-layer stream buffer 50) and the enhancement layer E(k,p) (the encoded difference between the input gray-scale image I(k,p) and the reconstructed image I"(k,p) obtained by the enhancement-layer encoder 40) in FIFO (first in, first out) sequence.

Summing up the above, the present invention first converts the input gray-scale image I(k,p) into a binary image Tb(k,p), and rearranges the binary image output sequence to obtain the base layer B(k,p) of the input gray-scale image I(k,p). Then, a predicted image I"(k,p) is derived using a least mean square (LMS) algorithm in adaptive signal processing with the difference from the input gray-scale image I(k,p) encoded to serve as the enhancement layer B(k,p) of the input gray-scale image I(k,p).

Further, the present invention can be applied to different pixel codings, such as YUV 444, YUV 422, YUV 420, RGB 888 and RGB 656, and produces high compression ratio and quality images. In addition, the amount of multiplication can be greatly reduced by applying the multi-table look-up method during the inverse halftoning process, therefore the process speed of the image compression device can also be improved and be practical for use in 32-bit processors.

The foregoing description of a preferred embodiment of the present invention has been provided for the purposes of illustration and description only. It is not intended to be exhaustive or to limit the invention to the precise forms disclosed. Many modifications and variations will be apparent to practitioners skilled in this art. The embodiment was chosen and described to best explain the principles of the present invention and its practical application, thereby enabling those who are skilled in the art to understand the invention for various embodiments and with various modifications as are suited to the particular use contemplated. It is intended that the scope of the invention be defined by the following claims and their equivalents.

What is claimed is:

1. An image compression device, comprising:

a halftone circuit which converts a gray-scale image into a binary image and rearranges the binary image output sequence to serve as a base layer of the gray-scale image;

an inverse halftone circuit which reconstructs a predicted image from the binary image the inverse halftone circuit including a linear sliding-window filter having optimal weights derived by minimizing reconstruction mean square errors; and a quantization circuit which encodes the difference between the gray-scale image and the predicted image to serve as an enhancement layer of the gray-scale image.

2. The image compression device as claimed in claim 1, further comprising a halftone stream buffer used to store the gray-scale image used in the halftone circuit.

3. The image compression device as claimed in claim 1, further comprising an enhancement-layer line buffer which stores the gray-scale image used in the quantization circuit.

4. The image compression device as claimed in claim 1, wherein the quantization circuit further comprises a comparator comparing the gray-scale image with the predicted image and an enhancement-layer encoder encoding the difference between these two images to serve as the enhancement layer of the gray-scale image.

5. The image compression device as claimed in claim 1, wherein the predicted image is obtained by the multi-table look-up method.

6. The image compression device as claimed in claim 1, further comprising a base-layer line buffer rearranging the binary image output sequence to serve as the base layer of the gray-scale image.

7. The image compression device as claimed in claim 1, further comprising a base-layer output circuit and an enhancement-layer output circuit respectively outputting the base-layer in the base-layer stream buffer and the enhancement layer of the quantization circuit in FIFO.

8. An image compression method, comprising:

halftoning a gray-scale image into a binary image and rearranging the binary image output sequence to serve as a base layer of the gray-scale image;

reconstructing a predicted image from the binary image by using a linear sliding-window filter having optimal weights derived by minimizing reconstruction mean square errors; and comparing the gray-scale image with the predicted image and encoding the difference between them to obtain an enhancement layer of the gray-scale image.

9. The image compression method as claimed in claim 8, wherein the gray-scale image is stored in a halftone line buffer for the halftoning process.

10. The image compression method as claimed in claim 8, wherein the gray-scale image is stored in an enhancement-layer line buffer for the comparing process.

11. The image compression method as claimed in claim 8, wherein the gray-scale image and the predicted image are compared by a comparator with the difference encoded by an A/D converter.

12. The image compression method as claimed in claim 8, wherein the multi-table look-up method is used in the inverse halftoning process to obtain the predicted image.

13. The image compression method as claimed in claim 8, wherein the binary image is stored and rearranged in a base-layer stream buffer as the base layer of the gray-scale image.

14. The compression method as claimed in claim 8, wherein the base layer and the enhancement layer are respectively outputted by a base-layer output circuit and an enhancement-layer output circuit.

* * * * *